United States Patent [19]

Schrammel

[11] Patent Number: 4,731,013
[45] Date of Patent: Mar. 15, 1988

[54] INJECTION MOLDING APPARATUS FOR THE INJECTION MOLDING OF DATA STORAGE DISCS

[75] Inventor: Werner Schrammel, Emmendingen, Fed. Rep. of Germany

[73] Assignee: Klöckner Ferromatik Desma GmbH, Malterdingen, Fed. Rep. of Germany

[21] Appl. No.: 37,218

[22] Filed: Apr. 10, 1987

[30] Foreign Application Priority Data

Apr. 19, 1986 [DE] Fed. Rep. of Germany ....... 3613334

[51] Int. Cl.$^4$ ............................................. B29C 45/26
[52] U.S. Cl. .................................... 425/542; 264/106; 264/328.11; 425/571; 425/575; 425/810
[58] Field of Search ............... 425/542, 548, 552, 575, 425/571, 810, DIG. 223; 264/106, 107, 328.9, 328.11, 328.16

[56] References Cited

U.S. PATENT DOCUMENTS

| 3,969,057 | 7/1976 | Pierre ................................ 425/810 X |
| 4,118,168 | 10/1978 | Rees et al. ...................... 425/810 X |
| 4,251,479 | 2/1981 | Pecht et al. ........................ 264/106 |
| 4,449,916 | 5/1984 | Ito et al. ............................ 425/575 X |
| 4,462,780 | 7/1984 | Stavitsky et al. ............... 264/106 X |
| 4,599,063 | 7/1986 | Gutjahr ..................... 425/DIG. 223 |
| 4,614,630 | 9/1986 | Pluim, Jr. .................... 264/328.16 X |

Primary Examiner—Richard L. Chiesa
Attorney, Agent, or Firm—Watson, Cole, Grindle & Watson

[57] ABSTRACT

An injection molding apparatus for the injection molding of data storage discs of thermoplastic synthetic material, includes an embossing plate mounted on a movable die for embossing information pits on one side of the discs. An insert confronting the embossing plate is mounted on the fixed die of the apparatus, the insert having a die opening through which the thermoplastic synthetic material may be injected into the die nest formed between the dies, and the insert being of non-corrosive and essentially non-porous, non-metallic material with its outer surface being highly polished, essentially smooth and unpitted so as to produce discs having a smooth side opposite the embossed side.

4 Claims, 2 Drawing Figures

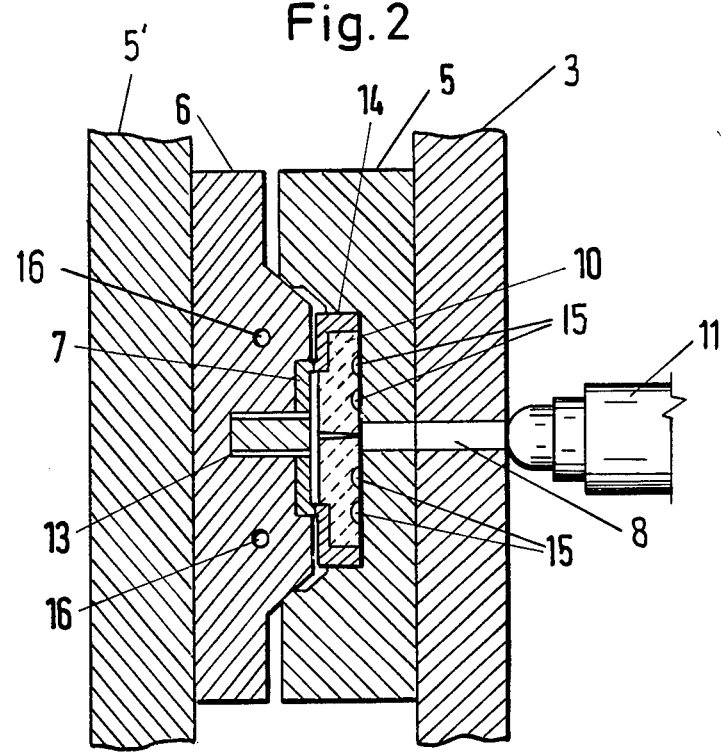

INJECTION MOLDING APPARATUS FOR THE INJECTION MOLDING OF DATA STORAGE DISCS

BACKGROUND OF THE INVENTION

This invention relates to an injection molding apparatus for the injection molding of data storage discs of thermoplastic synthetic material having information pits on one side, particularly compact discs of polycarbonate or polymethylmethacrylate. The apparatus includes a movable die having an embossing plate mounted thereon confronting the fixed die of the apparatus for embossing the information pits on the one side of the discs during the molding operation. And, the fixed die has an insert mounted thereon confronting the embossing plate and forming a die next therewith in a closed position of the dies. The insert is in the form of a plate having a die opening through which the thermoplastic synthetic material is injected into the die nest formed between the dies.

The production of data storage discs of thermoplastic material, such as compact discs, video discs, CD-Rom discs, Draw and EDRAW discs is carried out by injection molding machines during a molding operation in which considerable demands are placed on the production process. For example, the work areas in which these data storage discs are produced must normally be of oustanding cleanliness and, after the injection molding operation, the discs must be removed by robots from the injection molding dies.

The injection molding process for producing such data storage discs is much more difficult than the procedure for the production of more common injection molded parts. For example, it is necessary that the compact discs which are later to be scanned by laser beams be absolutely plane and smooth on the side from which the scanning by the laser beam takes place, and it is necessary that the information pits, having dimensions n the range of about 0.2 micron, be produced on the reverse side during molding with utmost precision. Moreover, it is necessary that during the injection molding process the injected material be cooled sufficiently slowly so that a desired structure and material orientation is obtained particularly to avoid high orientation levels. Considerable difficulties also result if the thermoplastic injected material is processed just below its decomposition temperature. This requires that even the median time that the plastic material remains in the plastification and injection nozzle be as short as possible, so that no thermal decomposition appears.

Apart from these rigid demands during the injection molding process, there are also special requirements for the injection molding dies which typically comprise a die half mounted on a movable die plate and a die half mounted on a fixed die plate. The movable die has an embossing plate for embossing the information pits on one side of the discs during the molding operation, while the fixed die has a plane surface confronting the embossing die. And, the fixed die typically has a die opening through which the thermoplastic synthetic material is injected into the die nest formed between the dies.

The movable die may be in the form of a male conical part received by a complementarily formed female fixed die during the closing operation, such that the dies form a die nest when closed for the production of the compact disc. In such closed position, the plastified synthetic material, preferably a plastified polycarbonate, is injected through the die opening of the fixed die and into the die nest formed between the dies.

Other than the fact that the female fixed die must have a plane and completely smooth surface confronting the embossing plate on the movable die, during sequential injection cycles care must be taken to avoid accumulation in this plane area of residual or extraneous synthetic material which could take place if the processing temperature elevated excessively, or if the time that the plastified synthetic material remains in the platification and injection nozzle is too long, such that the thermal decomposition of the material will occur.

Moreover, care must be taken that the flat area of the fixed die confronting the embossing plate is alway brightly polished and essentially non-porous, such that the diameter of the surface pores cannot be detected when subsequently scanning the information pits. Generally, the pore size should be as close to actual zero as possible, i.e., a practically pore-free polished surface should be provided in this area. Before the injection molding machine is operated, these polished areas must be washed clean at 50° C. with a non-corrosive cleaning solution, since even slight dirt remnants will render the cast compact discs unusable, since a perfect optical scanning could not be carried out.

Other interfering influences can take place during the injection molding operation, such that after the operation, moisture can precipitate in the polished flat area of the fixed die, the adhering mineral components of which could also result in rejection of the compact dies after molding. This is generally also applicable for other data storage discs which are laser scanned. A plane surface is also required when the scanning is carried out electromagnetically, such as with video discs, with the scanning heads at a distance from the scanning surface that measures in the range of several microns.

The injection molding dies for the injection of data storage discs generally have cooling and heating channels for known purposes.

The aforementioned problems persist since the mold dies must be of metal or metal alloys required for the injection molding machine.

SUMMARY OF THE INVENTION

It is therefore an object of the present invention to provide an injection molding apparatus for the injection molding of data storage discs which avoids the aforementioned problems especially by avoiding the condensation of moisture and the collection of residual or extraneous plastified synthetic material from previous injection cycles on the fixed female die surface.

This general objective is achieved by the provision of an insert mounted on the fixed die confronting the embossing plate, the insert being of non-corrosive and essentially non-porous, non-metallic material, and having a highly polished, essentially smooth and unpitted surface facing the embossing plate. By such an approach, the aforementioned problems are essentially avoided, or occur so rarely that the otherwise frequent waste of unusable compact discs or other data storage discs are considerably reduced.

The term "essentially non-porous" described for the insert according to the invention is intended to mean that the pores have a sufficiently small diameter such that the insert surface functions as an extremely smooth surface relative to the plastified synthetic material injected into the die nest.

The insert may comprise a ceramic material such as zirconium oxide or silizium nitride.

Other objects, advantages and novel features of the invention will become more aparent from the following detailed description of the invention when taken in conjunction with the accompanying drawings.

BRIEF DESCRIPTION OF THE DRAWINGS

FIG. 2 is an enlarged sectional view of the FIG. 1 dies shown closed.

DETAILED DESCRIPTION OF THE DRAWINGS

Figure 1:
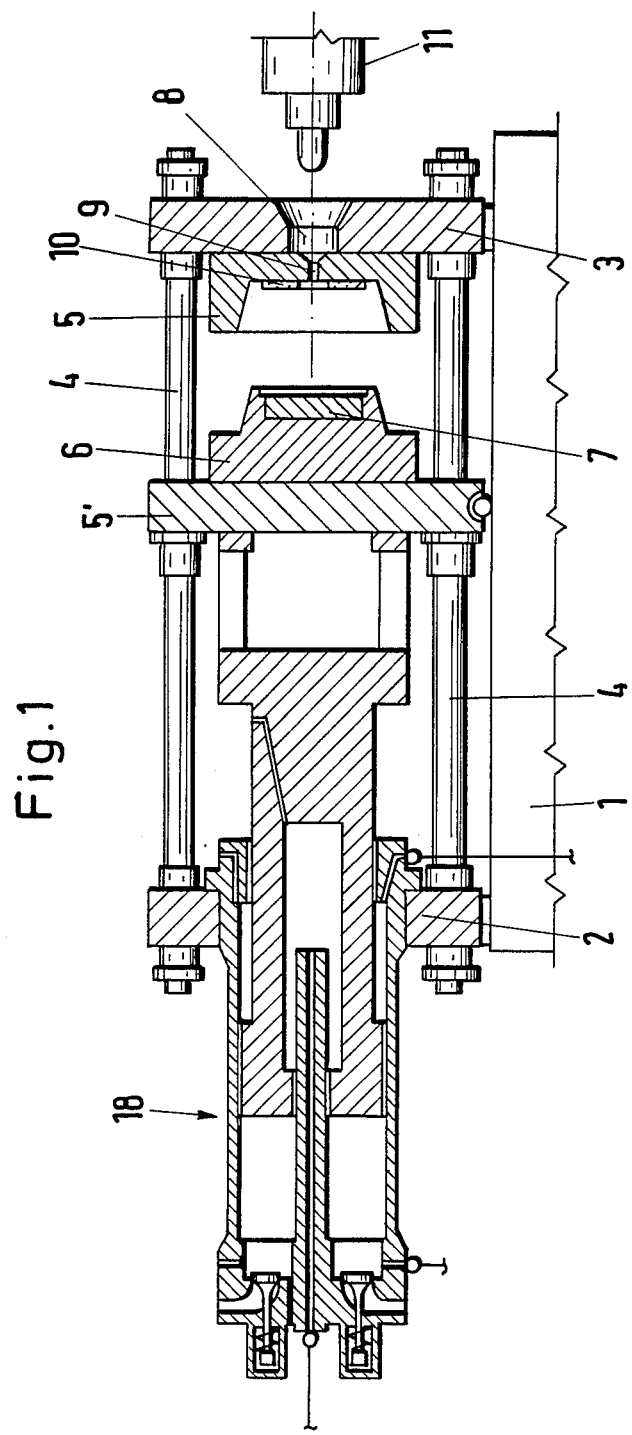
FIG. 1 is a longitudinal sectional view of an injection molding apparatus incorporating the invention.

Turning now to the drawings wherein like reference characters refer to like and corresponding parts throughout the several views, an injection molding apparatus incorporating the invention shown in FIG. 1 includes a support bed 1 on which a pair of spaced, parallel support plates 2 and 3 are fixedly mounted, and a plurality of guide rods or rails 4 lie parallel to the central axis of the plates and are affixed at opposite ends to the plates. A die 5 of a pair of mating dies 5,6 is fixed to support plate 3, and the other die 6 is mounted on a movable die plate 5' for movement together therewith along guide rods 4. The confronting dies define a die cavity therebetween into which plastic material is injected through coaxial die opening 8 via a plastification and injection nozzle unit 11.

An embossing palte 7 is fixedly mounted on movable die 6 in confronting relation to the fixed die for embossing information pits on one side of the discs (not shown) formed during the molding operation. The movable die is coupled to a die closing and locking unit 18 which may be similar to that disclosed in commonly owned U.S. Pat. No. 4,599,063. This unit is in the form of a hydraulic piston and cylinder unit which comprises a cylinder fixedly mounted on support plate 2, and a plunger or piston arranged for reciprocating movement therein and being connected to movable die 6 through die plate 5'. The disclosure of the die closing and locking mechanism of U.S. Pat. No. 4,599,063 is specifically incorporated herein by reference.

An insert 10, of ceramic material, is mounted on fixed die 5, the insert being in the form of an annular disc having a die opening therein coaxial with die opening 8 through which the thermoplastic synthetic material is injected into the die nest formed between the dies.

For molding a data storage disc, the movable die is closed relative to the fixed die by operation of die closing mechanism 18 in a known manner. Simultaneously or subsequently, the plastification and injection unit 11 is moved into its FIG. 2 position in contact with die opening 8 and plastified material is injected into the die nest through the coaxial openings 8,9 and the die opening in insert 10. Thereafter the die is opened to its position shown in FIG. 1, and the molded compact disc is removed in the normal manner as by means of a robot (not shown). It has been demonstrated that use of insert 10 according to the invention had the effect of avoiding the aforementioned problems which previously occurred during the injection molding of compact discs, and the insert remained corrosion-free even for long periods of time.

FIG. 2 is an enlarged view of the mating dies shown with the dies in a closed position. Embossing plate 7 is mounted on movable die 6 in any known manner as by means of a clamping sleeve 13. Insert 10 is mounted on fixed die 5 by means of a clamping ring 14 which retains the ceramic plate along its periphery as shown.

Insert plate 10 may have channels 15 for supplying a cooling medium to the fixed die and insert, and the movable die may have channels 16 for supplying a heating medium thereto so that the usual temperature ranges of the injection molding apparatus can be adjusted in a known manner.

Insert 10 is of a non-corrosive and esentially non-porous, non-metallic material, and the insert has a highly polished, essentially smooth and unpitted surface facing the embossing plate, such that the discs formed during the molding operation have a smooth side opposite the embossed side so as to thereby avoid any interference when scanning the information pits following the molding operation. Insert 10 may be of ceramic material such as zirconium oxide or silizium nitride.

What is claimed is:

1. An injection molding apparatus for the injection molding of data storage discs of thermoplastic synthetic material having information pits on one side, particularly compact discs of polycarbonate or polymethylmethacrylate, comprising a pair of spaced, parallel support plates, guide rods affixed to and extending between said plates and lying parallel to the central axis thereof, a die plate mounted on said rods for movement therealong, a fixed die mounted on one of said support plates, a movable die confronting said fixed die and being mounted on said die plate for movement therewith, a hydraulic piston and cylinder unit for moving said movable die relative to said fixed die during the molding operation, said one support plate and said fixed die having coaxial die openings, an embossing plate mounted on said movable die confronting said fixed die for embossing the information pits on said one side of said discs during the molding operation, and an insert mounted on said fixed die confronting said embossing plate and forming a die nest therewith in a closed position of said dies, said insert comprising a plate having a die opening coaxial with said die openings through which the thermoplastic synthetic material may be injected into the die nest formed between said dies, said insert being of non-corrosive and essentially non-porous, non-metallic material, and said insert having a highly polished, essentially smooth and unpitted surface facing said embossing plate, whereby said discs formed during the molding operation each have a smooth side opposite said one side so as to avoid any interference when scanning said information pits following said molding operation.

2. The apparatus according to claim 1, wherein said insert comprises ceramic material.

3. The apparatus according to claim 2, wherein said ceramic material comprises zirconium oxide.

4. The apparatus according to claim 2, wherein said ceramic material comprises silizium nitride.

* * * * *